UNITED STATES PATENT OFFICE.

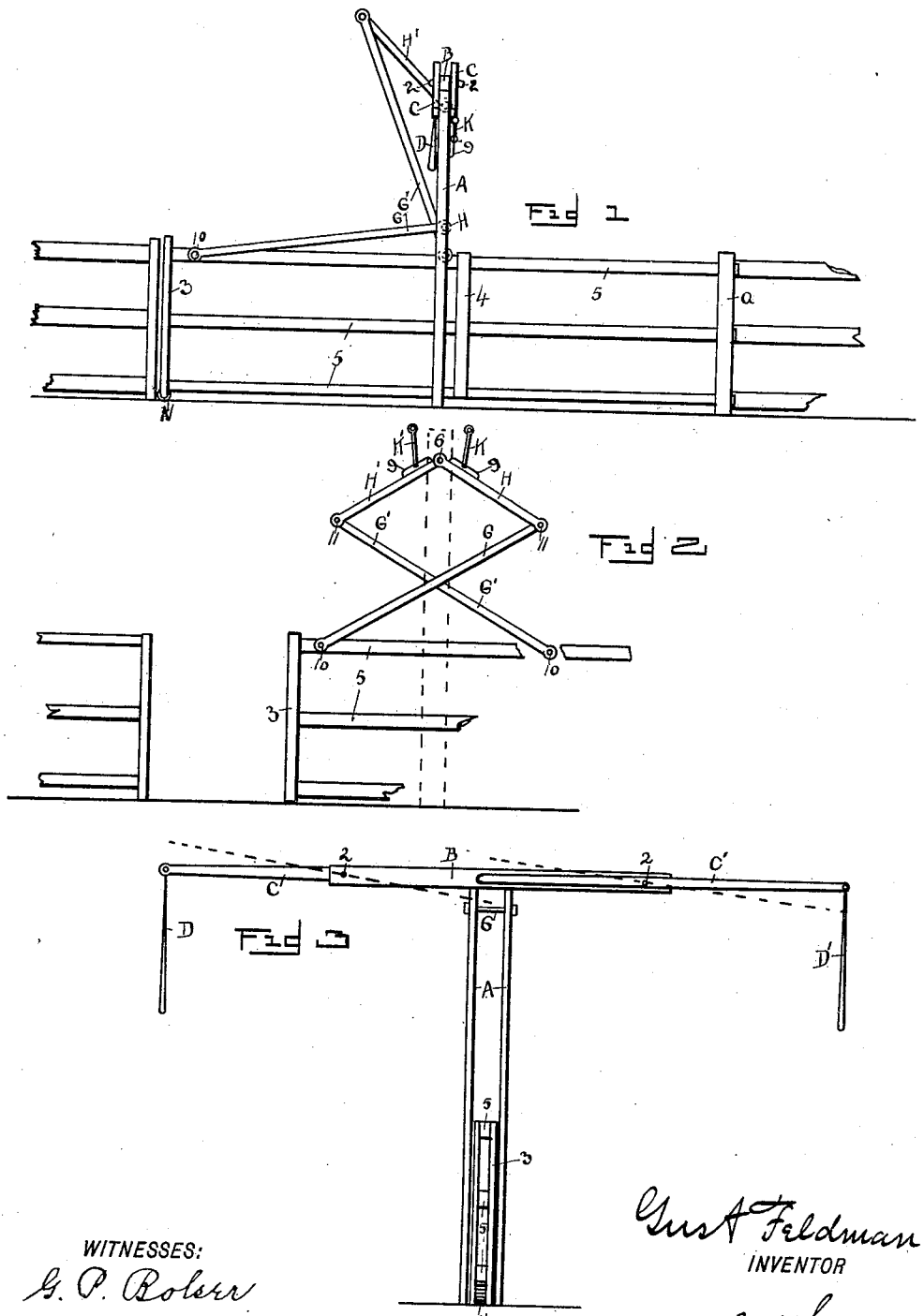

GUST FELDMAN, OF WALNUT, IOWA.

FARM-GATE.

SPECIFICATION forming part of Letters Patent No. 614,540, dated November 22, 1898.

Application filed July 20, 1895. Renewed June 24, 1898. Serial No. 684,422. (No model.)

*To all whom it may concern:*

Be it known that I, GUST FELDMAN, residing at Walnut, in the county of Pottawattamie and State of Iowa, have invented certain useful Improvements in Farm-Gates; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in farm-gates, the object being to provide a gate that shall be so arranged that the gate can be opened by an operator from a vehicle.

In the accompanying drawings, Figure 1 shows a side elevation of my improved gate as closed. Fig. 2 shows a broken view, with parts removed, of the gate half opened, showing the arrangement of the gate-toggles, while Fig. 3 shows the arrangement of the hollow main supporting-post, showing the gate-toggles removed.

A in the drawings represents a suitable post, which is provided above with the cross-bar B, to which are centrally pivoted two levers C C', having the depending operating-bars D D'. One of these levers is pivoted to each side of the bar B.

The gate to be operated comprises the horizontal bars 5 5, the front gate-post 3, and the intermediate gate-post 4. In operation these bars 5 slide through a post $a$, as is shown, the gate-post 3 being provided below with a roller N, though, if desired, this post could be made to slide directly upon the ground. Pivotally secured to the upper gate 5 are two gate-levers G G' of equal length, which are pivoted between the posts 3 and 4, one near the post 3 and the other near the post 4. Secured to each of the levers G G', at their free ends, are two shorter toggle-bars H H', which above are united by means of a suitable bolt 6, which bolt in Fig. 3 is shown in position. Each of the upper toggle-bars H is further provided with an approximately U-shaped staple 9, over which one of the bars K works. These bars K are secured one to each of the operating-levers C C'. Now when these bars are all properly connected if one of the levers C is drawn down it carries its connected bar K and toggle H upward and so carries the connected gate-toggle forward and upward to close the gate. In Fig. 1 the bar D' has been shown as depressed, so that the bar H' and G' would have been carried upward to close the gate. In Fig. 2 the operating-levers are shown in a horizontal position, so that the gate is half open.

The gate can be operated from each side in raising or lowering the levers C C' by means of the operating-handles.

The device is exceedingly simple and when properly constructed is counterbalanced, so that a child can operate the same.

Now, having thus described my said invention, what I claim as new, and desire to secure by United States Letters Patent, is—

The combination with a gate of guide-bars extending from said gate, a guide-post provided with openings adapted to receive said guide-bars, a bifurcated standard, said gate reciprocating within the bifurcation of said standard, a pivot-bar within the upper end of said bifurcation, two stub-levers extending in opposite directions from said pivot-bar, and two main levers one extending from each of said stub-levers, and both pivoted to said gate, in combination with two pivoted operating-bars extending in opposite directions each secured to one of said stub-levers, and so arranged that when the gate is closed, one of said bars is tilted upward and when opened, the remaining bar is tilted upward, both of said levers rocking in the operation of opening or closing said gate.

In testimony whereof I affix my signature in presence of two witnesses.

GUST FELDMAN.

Witnesses:
 PETER KOLL,
 CHAS. M. BURKE.